United States Patent Office 3,482,848
Patented Dec. 9, 1969

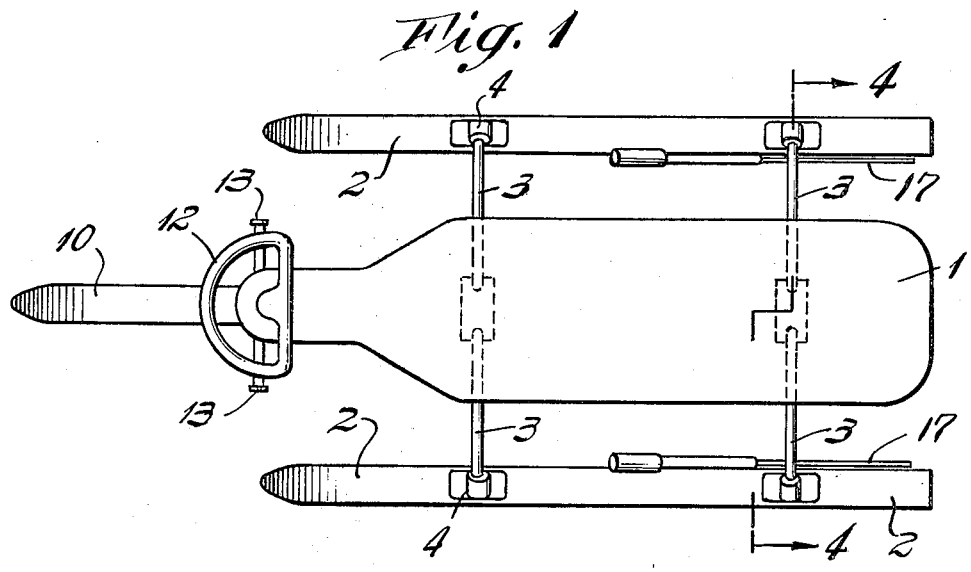
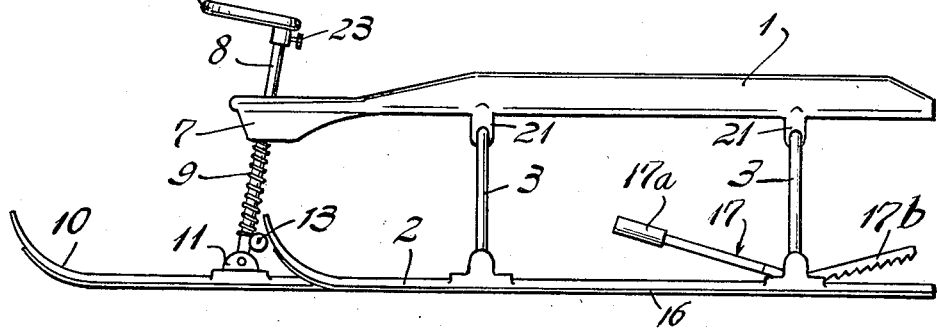
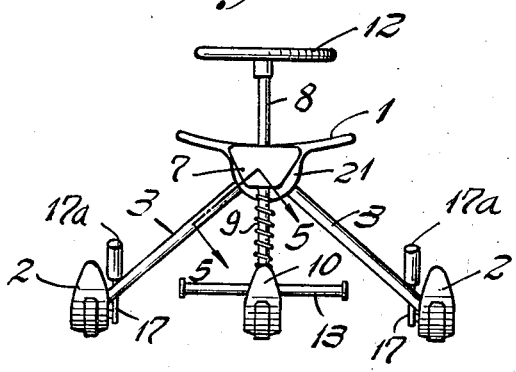

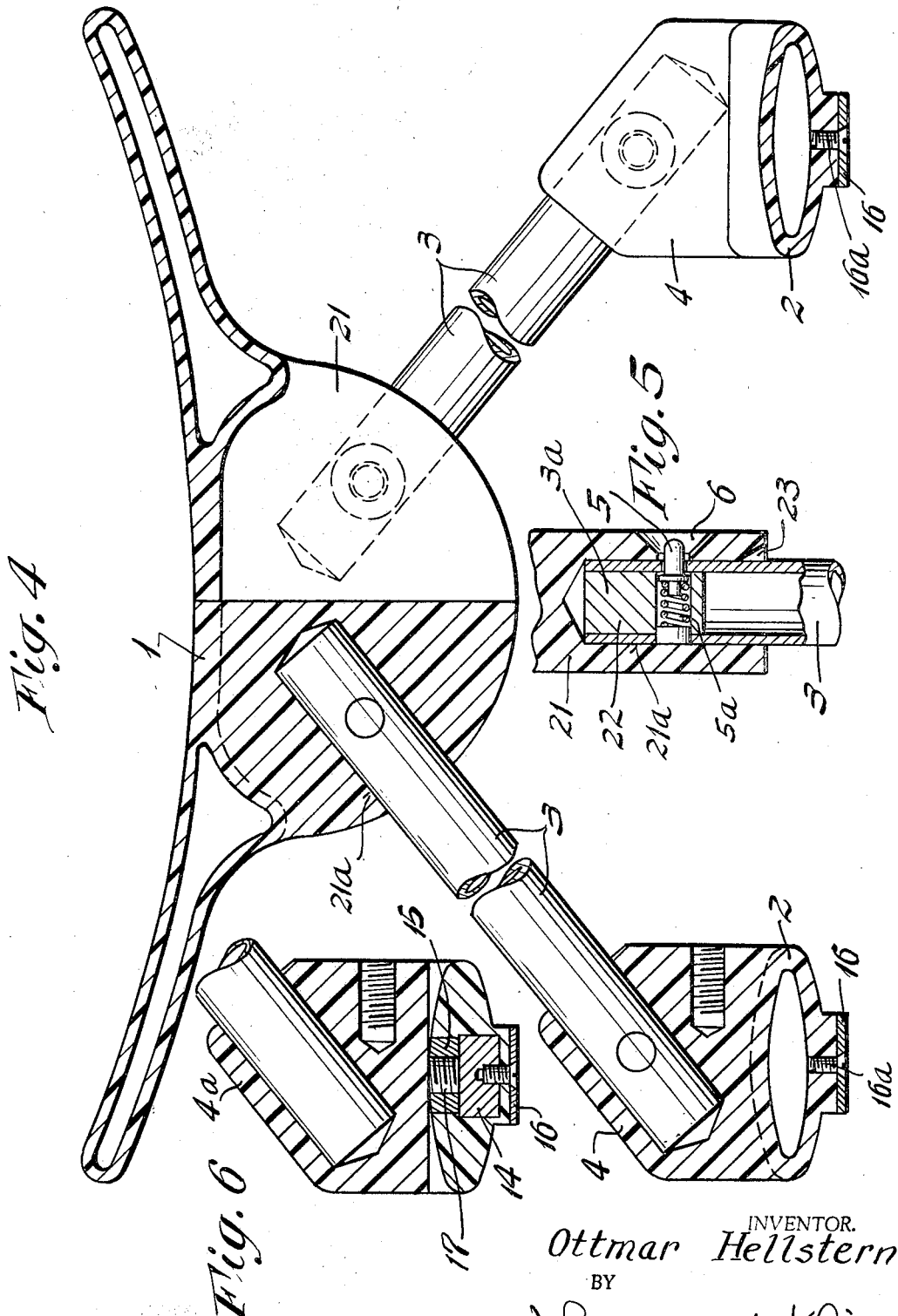

3,482,848
STEERABLE FOLDING SLED
Ottmar Hellstern, Am Feldweg, 7151 Hanweiler Kreis, Waiblingen, Germany
Filed Feb. 26, 1968, Ser. No. 708,013
Claims priority, application Germany, Mar. 17, 1967, H 62,161
Int. Cl. B62b 9/09, 13/16
U.S. Cl. 280—16                    8 Claims

ABSTRACT OF THE DISCLOSURE

A riding sled having its seat unit connected to at least one, and preferably to both, sled runners by readily removable seat supports or props. It is steerable with a steering wheel heading the steering shaft and rotating a steering runner. The bearing for the steering shaft is housed in the head of the seat unit. The removal of the seat supports or props, steering wheel, steering shaft and steering runners from the seat unit providing for the packaging of the parts in a compact unit.

---

Heretofore a riding sled has had a steel tube frame onto which slats are fastened to form a seat. The steering runner mounted in front of the sled, placed longitudinally in the center, is operated with the aid of a handle bar or steering wheel. Due to its frame type structure, the sled requires excessive space.

An object of the present invention is to provide a sled which can easily be disassembled and folded into its individual parts. According to this invention, this object is achieved by employing easily removable seat supports or props connected to a seat unit and sled runners, and a slide-out steering means or handle bar which allows the removal of the steering shaft from the seat unit. By choice of variable seat prop lengths, a different seat height, as well as variable track width, can be achieved requiring no additional parts.

With the above features, the sled can be disassembled and the component parts can be stored in a carrying bag requiring minimum storage space. In its disassembled state the sled can easily be stored and transported. Due to the use of snap-lock connections and/or hand removable bolts, the sled can be assembled without the use of tools and without additional accessories.

As a further advantage of the invention, the steering shaft is connected to the steering runner by means of a flexible joint, the shaft axis running almost vertically to the steering runner and the joint axis approximately horizontal. The steering shaft is also equipped with a tension spring between the seat unit and steering runner to push the runner to the ground. The flexible joint permits folding of the steering shaft and steering runner to smallest dimensions, without having to separate these two parts. Because of the spring action the steering runner does not have to be pressed to the ground by the driver.

The holders on the seat unit for receiving the seat supports or props are preferably formed as semicircular disks with receptacle openings to receive one seat prop each, arranged radially at a centri-angle of approximately 100° so that the sled resembles a triangular shape when viewed from the front, whereby the seat unit rests on the upper tip of the triangle. This results in a stable construction of the sled with relatively simple design.

A simplified fabrication of the sled is further achieved by the seat unit being made of plastic and reinforced with silicon fiber and including the holders in a one-piece design. The runners may also be made of plastic material and reinforced with silicon fiber as a one-piece unit including its pertinent joint or holding parts.

The runner, adaptable to all snow conditions, is a further development of the invention in that its transverse section resembles a T-design, whereby the crossbar of the T touches the surface only in soft snow. On a hard surface, such as packed snow, merely the narrow leg of the T or the center strip of the runner contacts the surface. This insures good traction and prevents skidding and sliding sideways, especially if hard material such as steel is used for the center strip of the runner. In soft snow the entire width of the runner depresses or rests on the surface.

Other features and advantages of the invention will hereinafter appear.

In the accompanying drawings:

FIGURE 1 is a top view of the sled.
FIG. 2 is a side view of the sled.
FIG. 3 is a front view of the sled.
FIG. 4 is a sectional view taken along the line 4—4 of FIG. 1 on an enlarged scale.
FIG. 5 is a sectional view taken along the line 5—5 of FIG. 3 on a larger scale.
FIG. 6 is a modified sectional view of another form of holder and runner.

The sled has a seat unit 1, of self-supporting structure, preferably fabricated of plastic material, reinforced with silicon fiber, for example, by lamination. The side runners 2 and steering runner 10 consist of the same material. For purposes of weight reduction the seat unit 1 and the runners 2 and 10 are preferably of hollow construction as shown in FIG. 4.

The seat unit 1 and the sled runners 2 are interconnected with tubular metal seat supports or props 3. As herein illustrated, the runners 2 have holders or receptacles 4, and the seat unit 1 contains holders or receptacles 21 to receive the ends of the seat supports. The receptacles 21 are made in disk form with the openings 21a arranged radially at a centri-angle of approximately 100°.

The seat supports or props 3 are hollow and equipped at both ends with plugs 3a carrying snap bolts 5 activated by tension springs 5a and seated in laterally extending guide compartments 22. The holders 4 and 21 have laterally accessible conically narrowing catch openings 6, into which the snap bolts 5 pass and through which they are manually removed in order to dislodge the seat supports or props 3 from their fixed position. The mouth of the receptacles 4 and 21 are conically widened or have a groove at an oblique angle as at 23 (FIG. 5) which facilitates the return of the snap bolts 5 into the seat supports 3 at time of assembly, whereby the bolts 5 will only snap into their locking position when they have reached the catch opening 6.

A pivoting steering shaft 8 has its bearing in the head 7 of the seat unit 1 and its axis running obliquely whereby its lower end protrudes beyond the head 7. At the lower end a joint 11 is provided, connecting the steering shaft 8 with the steering runner 10. Above the joint 11, a footrest 13 is mounted on the steering shaft 8 extending to both sides. Between the footrest 13 and the head 7 of the seat a spiral tension spring 9 has been inserted which pushes the steering runner to the ground. A steering means or wheel 12 is attached to the steering shaft 8 with a large bolt 23 that can easily be tightened or loosened by hand. While a bushing can be inserted in the head 7 of the seat unit 1 to take up the steering shaft 8, in which case the head 7 can be of thinner construction, the illustrated form of the invention shows a heavy section at head 7.

To the rear holding units 4 of each runner 2, a brake lever 17 is pivoted by suitable means. The brake lever has a handle 17a on the upper end and is tooth-shaped on the lower part 17b.

The runners, as shown in FIG. 4 are of T-shaped cross-section and arranged so that the crossbar of the T touches the surface only in soft snow, whereas the stem of the T engages the hard surface, such as packed snow or ice. Preferably, the end of the stem of the T is provided with a steel strip 16 which is mounted in the center of the runners 2 and 10 by means of screws 16a or the like. While the strip 16 can be of U or I cross-section and fastened by cross-pins, in the illustrated form of the invention it is flat in cross-section whereby the steel tracks 16 form the center strip as shown in FIGS. 2 and 4. On hard foundations, such as ice or packed snow, merely the steel track of the runner touches the surface, while on freshly fallen snow the entire width of the runner touches the ground. The runner provides excellent traction and prevents transverse sliding or skidding of the sled.

In the form of the invention illustrated in FIG. 6, the receptacle 4a is built as a separate unit and is secured to the runner. As shown, the runner is furnished with an insert 14, on which bolt nuts 15 are mounted and so spaced as to receive the bolt 17 fastened to the receptacles 4a.

To disassemble the sled, the steering wheel 12 is removed first by loosening the large bolt 23 manually, whereafter the steering shaft 8 slides downward out of the head 7 of the seat unit 1 and by folding at the joint connection 11, the shaft 8 can be placed parallel with the steering runner 10. By pushing in the snap bolts 5, the seat supports 3 can be loosened and removed from the holding receptacles 4 and 21. In this simple manner the sled can be disassembled and the individual parts are easily stored in a canvas carrying bag requiring minimum space for easy transport. Assembling of the parts is accomplished equally simply by following the above procedure in reverse order.

Should only one person ride the sled, the feet resting on the footrest 13 are used for steering the sled while the hands can activate the brake levers 17 if necessary.

I claim:

1. A riding sled comprising a seat unit connected to side runners spaced laterally of the seat by a plurality of transversely and downwardly extending tubular seat supports; a turnable steering runner; a steering shaft connected to the turnable steering runner; and steering means connected to the steering shaft, the improvement wherein said tubular seat supports are detachably attached to said seat unit and said side runners by manually actuatable latch means so as to be readily taken apart, and said steering shaft passes through a head portion of the seat unit and the steering means includes detachable means whereby said steering means can easily be detacher from the steering shaft permitting removal of the shaft from the seat unit, said seat unit and runners being provided with holding units for receiving the ends of the seat supports, said manually actuatable latch means comprising spring-driven snap bolts adjacent the ends of the seat supports and movable transversely to the axis of the supports, and said holding units on the seat unit and sled runners having catch openings into which the snap bolts project.

2. The invention as defined in claim 1 wherein the steering shaft is provided with a footrest which also serves as the base for a tension spring disposed around the steering shaft and below the seat unit, forcing the steering runner to the ground.

3. The invention as defined in claim 1 wherein the holding units on the seat unit are of semicircular disk form having seat support receiving openings arranged radially at a centri-angle of approximately 100° to receive the end of one seat support in each.

4. The invention as defined in claim 1 wherein the seat unit, including the holding units, is formed as a unitary structure of plastic material with silicon fiber reinforcement.

5. The invention as defined in claim 1 wherein the runners are formed of a plastic material having silicon fiber reinforcement and have a metal strip located centrally and secured on the undersurface to project downwardly therefrom.

6. The invention as defined in claim 1 wherein holders for receiving said seat supports are formed separately from the runners, and means embedded in said runners for securing said holders to said runners.

7. The invention as defined in claim 1 wherein said seat unit and said runners are hollow and formed of molded plastic material whereby the weight of the sled is reduced.

8. The invention as defined in claim 1 wherein the external surface of the holding units around said catch openings is conical whereby easy access to the ends of the snap bolts is afforded to manually release said snap bolts.

References Cited

UNITED STATES PATENTS

| | | | |
|---|---|---|---|
| D. 148,829 | 2/1948 | Turner | 34—15 |
| D. 202,362 | 9/1965 | Asai | 34—15 |
| 2,245,151 | 6/1941 | Martinet | 285—317 |
| 2,883,205 | 4/1959 | Dulski | 280—16 |
| 3,118,696 | 1/1964 | Resarf | 287—119 |
| 3,347,575 | 10/1967 | Morris | 285—303 |

FOREIGN PATENTS 36,787  3/1909  Austria.

LEO FRAGLIA, Primary Examiner

ROBERT R. SONG, Assistant Examiner

U.S. Cl. X.R.

280—22